United States Patent
Olsen

(10) Patent No.: US 10,136,624 B1
(45) Date of Patent: *Nov. 27, 2018

(54) FISHING ROD HANDLE

(71) Applicant: Eric Olsen, Daytona Beach, FL (US)

(72) Inventor: Eric Olsen, Daytona Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/813,835

(22) Filed: Nov. 15, 2017

Related U.S. Application Data

(63) Continuation of application No. 14/744,276, filed on Jun. 19, 2015, now Pat. No. 9,844,213, which is a continuation-in-part of application No. 29/530,233, filed on Jun. 15, 2015, now Pat. No. Des. 780,881.

(51) Int. Cl.
  *A01K 87/08* (2006.01)
  *B25G 1/10* (2006.01)
  *B25G 3/00* (2006.01)

(52) U.S. Cl.
  CPC .............. *A01K 87/08* (2013.01); *B25G 1/102* (2013.01); *B25G 3/00* (2013.01)

(58) Field of Classification Search
  CPC . B25G 1/102; B25G 3/00; B25G 3/36; A01K 87/08
  See application file for complete search history.

(56) References Cited

U.S. PATENT DOCUMENTS

| | | |
|---|---|---|
| 1,151,012 A | 8/1915 | Herringstad |
| 1,796,249 A | 3/1931 | Gillaspy |
| 2,084,931 A | 6/1937 | Williams |
| 2,390,544 A | 12/1945 | Lamb |
| 2,443,946 A | 6/1948 | Bozorth, Jr. |
| 2,505,075 A | 4/1950 | Weinberger |
| 2,653,406 A | 9/1953 | Grabiak |
| 2,685,755 A | 8/1954 | Gorenflo |
| 3,155,414 A | 11/1964 | Bales |
| 3,213,563 A | 10/1965 | Zeigler |
| 3,372,509 A | 3/1968 | Arsenault |
| D228,278 S | 9/1973 | Tegner |
| 4,014,129 A | 3/1977 | Capra |
| 4,041,635 A | 8/1977 | Savage |
| D250,853 S | 1/1979 | Fund |
| 4,190,977 A | 3/1980 | Casper |
| D258,231 S | 2/1981 | Airhart |
| 4,519,159 A | 5/1985 | Fazio |
| D289,193 S | 4/1987 | Childre |
| 4,701,142 A | 10/1987 | Merritt |
| D299,737 S | 2/1989 | Andreasen |
| 4,860,483 A | 8/1989 | Hlad |
| D314,287 S | 2/1991 | Albright, Sr. |

(Continued)

*Primary Examiner* — Michael H Wang
(74) *Attorney, Agent, or Firm* — Brian S. Steinberger; Law Offices of Brian S. Steinberger, P.A.

(57) ABSTRACT

Handles, apparatus devices, and methods for clamping and using an extra handle onto fishing rods that provides enhanced leverage while holding the existing elongated handle on the rod between clamps on the extra handle, as well as being used for carrying the rod before and after it is being used. The extra handle has bent member between two clamp ends with an inner generally wide flat smooth face, and lower and upper smooth perimeter edge surfaces, that provide a comfortable surface against the back of the hand of the fisherman and helps provide leverage to the fisherman while fishing with the rod and carrying the rod before and after use.

20 Claims, 18 Drawing Sheets

(56) References Cited

U.S. PATENT DOCUMENTS

| | | |
|---|---|---|
| 5,065,475 A | 11/1991 | Watt |
| 5,088,225 A | 2/1992 | Yamamoto |
| D324,409 S | 3/1992 | Latouche |
| D327,727 S | 7/1992 | Robbins et al. |
| D330,839 S | 11/1992 | Barrington et al. |
| D331,617 S | 12/1992 | Onishi |
| D342,985 S | 1/1994 | Grice |
| D352,341 S | 11/1994 | Park |
| D353,262 S | 12/1994 | Cantavespre et al. |
| D356,622 S | 3/1995 | Balkenbush |
| 5,426,884 A | 6/1995 | Makowsky |
| 5,581,931 A | 12/1996 | Swisher |
| D384,573 S | 10/1997 | Lee |
| D407,292 S | 3/1999 | Carsello |
| 6,237,274 B1 | 5/2001 | Head et al. |
| 6,397,511 B1 | 6/2002 | Atnip |
| D470,214 S * | 2/2003 | Wickizer .................. D22/139 |
| 6,705,041 B2 | 3/2004 | Hays |
| 6,748,691 B2 | 6/2004 | Doucette |
| D508,727 S | 8/2005 | Peters |
| D584,792 S * | 1/2009 | Childers .................. D22/147 |
| 7,657,972 B2 | 2/2010 | Jenkins |
| 7,707,766 B2 | 5/2010 | Millen et al. |
| 7,854,086 B2 | 12/2010 | Huynh |
| D639,896 S * | 6/2011 | Vasquez .................. D22/142 |
| D667,992 S * | 9/2012 | Serrano .................. D26/155 |
| 8,381,358 B1 | 2/2013 | Frey |
| D698,482 S | 1/2014 | Chen |
| D721,448 S | 1/2015 | Solstad |
| D732,138 S * | 6/2015 | Wooley .................. D22/147 |
| D749,189 S | 2/2016 | Noraker |
| D750,735 S | 3/2016 | Nakamichi |
| D752,176 S | 3/2016 | Johns et al. |
| D756,729 S * | 5/2016 | Macyszyn .................. D8/10 |
| D780,881 S | 3/2017 | Olsen |
| 2012/0017487 A1 | 1/2012 | O'Keefe |
| 2013/0057721 A1 | 3/2013 | Shmueli et al. |
| 2014/0047758 A1 | 2/2014 | Ciciulla |
| 2016/0037762 A1 | 2/2016 | Thomas |
| 2016/0192628 A1 | 7/2016 | Omura |

\* cited by examiner

SECTION A-A

SECTION B-B

SECTION C-C

SECTION D-D

SECTION E-E

FISHING ROD HANDLE

CROSS REFERENCE TO RELATED APPLICATIONS

This application is a Continuation of U.S. patent application Ser. No. 14/744,276 filed Jun. 19, 2015, now U.S. Pat. No. 9,844,213, which is a Continuation In Part of U.S. Design patent application Ser. No. 29/530,233 filed Jun. 15, 2015, now U.S. Design patent D780,881. The entire disclosure of each of the applications listed in this paragraph are incorporated herein by specific reference thereto.

FIELD OF INVENTION

This invention relates to fishing, and in particular to handles, apparatus devices, and methods for clamping and using an extra handle onto fishing rods that provides enhanced leverage while holding the existing elongated handle on the rod, as well as being used for carrying the rod before and after it is being used.

BACKGROUND AND PRIOR ART

Fishing rods have generally remained unchanged over the years. For example, conventional fishing rods include an elongated body having at the proximal end, a handle. Typically, the reel is attached towards the distal region of the handle. The problem with the conventional fishing rods is that they are difficult to maintain leverage while holding the rod in an upright fishing position over time. Additionally, the elongated handles are difficult to be used to carry the fishing rods before and after the rods are being used.

Fishing usually occurs over long periods of time, where the fisherman must continuously hold the fishing rod outward while waiting for a fish to strike. Since conventional fishing rods are essentially elongated poles, the forces transferred to the handle increases as the fishing rod length increases. This is due to the force of gravity and the physics of torque. Further, since the conventional fishing rod is linear, the fisherman typically holds the fishing rod with a severely bent or rotated wrist, which can lead to discomfort that can include wrist strain and possible injury and damage to one's hands and wrists and arms over time. The problems are even more acute when the fishermen is going after larger fish such as bluefish, and the like as compared to smaller fresh water fish, and the like.

Over the years a variety of rod configurations have been proposed to address these problems. However, there needs to be better solutions to these problems.

U.S. Pat. No. 6,705,041 to Hays describe fishing rods with removable handles. However, the double clamped handle shown in FIGS. 1-5 is intended to be attached on both sides of a bent handle and not along a straight elongated handle that exists in most fishing rods. Also, the raised handle portion 11, has finger indentations that are used for the fisherman to carry the fishing rod by the handle so that the fisherman is not able to continue to grip the actual elongated rear butt end handle portion of the rod. Additionally, if the fisherman does try to grip the existing elongated end of the rod, the downwardly protruding finger indentations on the extra handle will uncomfortably press into the back of the hand of the fisherman. As such, this extra handle cannot be used if the fisherman wishes to continuously grip the rod itself.

U.S. Pat. No. 7,854,086 to Huynh describe a fishing rod with ergonomic handle that requires the handle be separately attached to the end of an existing fishing rod handle. This handle also will not allow the fisherman to use the existing elongated handle on the fishing rod.

Thus, the need exists for solutions to the above problems with the prior art.

SUMMARY OF THE INVENTION

A primary objective of the present invention is to provide handles, apparatus devices, and methods for clamping and using an extra handle onto existing elongated handle ends on fishing rods that enhances leverage while holding the existing elongated rod handle between the clamps on the extra handle.

A secondary objective of the present invention is to provide handles, apparatus devices, and methods for clamping a handle onto existing elongated handle ends on fishing rods that is also useful for carrying the rod before and after it is being used.

A third objective of the present invention is to provide handles, apparatus devices, and methods for clamping and using an extra handle onto existing elongated handle ends on fishing rods, wherein the handle includes an inner bent member with generally flat smooth inner surface and smooth lower edges that are comfortable against the back of the hand of the fisherman gripping the existing handle end of the rod.

A preferred embodiment of an attachable handle for fishing rods, can include a first clamp, a second clamp, a first stem portion extending upward from the first clamp, a second stem portion extending upward from the second clamp, and a bent member between an upper end of the first stem portion and an upper end of the second stem portion, the bent member having a lower smooth edge and upper smooth edge, wherein the first clamp and the second clamp are attachable about an existing elongated handle on a fishing rod.

The first clamp and the second clamp can each include an upper member and a lower member that clamp to one another with fasteners, the fasteners being selected from screws and bolts.

The first stem and the second stem can each have a generally flat front face surface and a generally flat rear face surface portion being parallel to longitudinal axis running through each of the first clamp and the second clamp. The second stem can have a length longer than the first stem.

The bent member can have a first inner concave surface and a second inner concave surface with the lower smooth edge on the bent member attached therebetween. The bent member can have a generally smooth front side surface and a generally smooth rear side surface.

The attachable handle can have a first convex outer curved perimeter surface between the upper end of the first stem portion and the bent member, and a second convex curved perimeter surface between the upper end of the second stem portion and the bent member.

The second convex curved perimeter surface can have a larger angle than the first convex curved perimeter surface.

The attachable handle can have a length of approximately 6.75 inches between the first clamp and the second clamp.

The upper member of the first clamp, the upper member of the second clamp, the first stem portion, the second stem portion, and the bent flat member can be formed from a single piece of plastic.

A method using a handle with a fishing rod, can include the steps of providing an fishing rod with a reel attached to the rod, and a rearwardly extending handle end, providing a first clamp with a first stem portion extending upward from the first clamp, providing a second clamp with a second stem portion extending upward from the second clamp, providing a bent member between an upper end of the first stem portion and an upper end of the second stem portion, the bent member having a lower smooth perimeter edge and upper smooth perimeter edge, clamping the first clamp and the second clamp about the rearwardly extending handle end of the fishing rod, and gripping a portion of the handle end of the fishing rod between the first clamp and the second clamp to increase leverage while fishing with the fishing rod.

The clamping step can include the steps of providing the first clamp and the second clamp each with an upper member and a lower member that clamp to one another with fasteners, and selecting the fasteners from screws and bolts.

The method can include the step of providing the second stem with a longer length than the first stem.

The method can include the step of providing the bent member with a first inner concave surface and a second inner concave surface with the lower smooth edge on the bent member attached therebetween.

The method can include the step of providing the bent member with a generally smooth front side surface and a generally smooth rear side surface.

The method can include the steps of providing a first convex outer curved perimeter surface between the upper end of the first stem portion and the flat bent member, and providing a second convex curved perimeter surface between the upper end of the second stem portion and the bent member.

The method can include the step of providing the second convex curved perimeter surface with a larger angle than the first convex curved perimeter surface.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
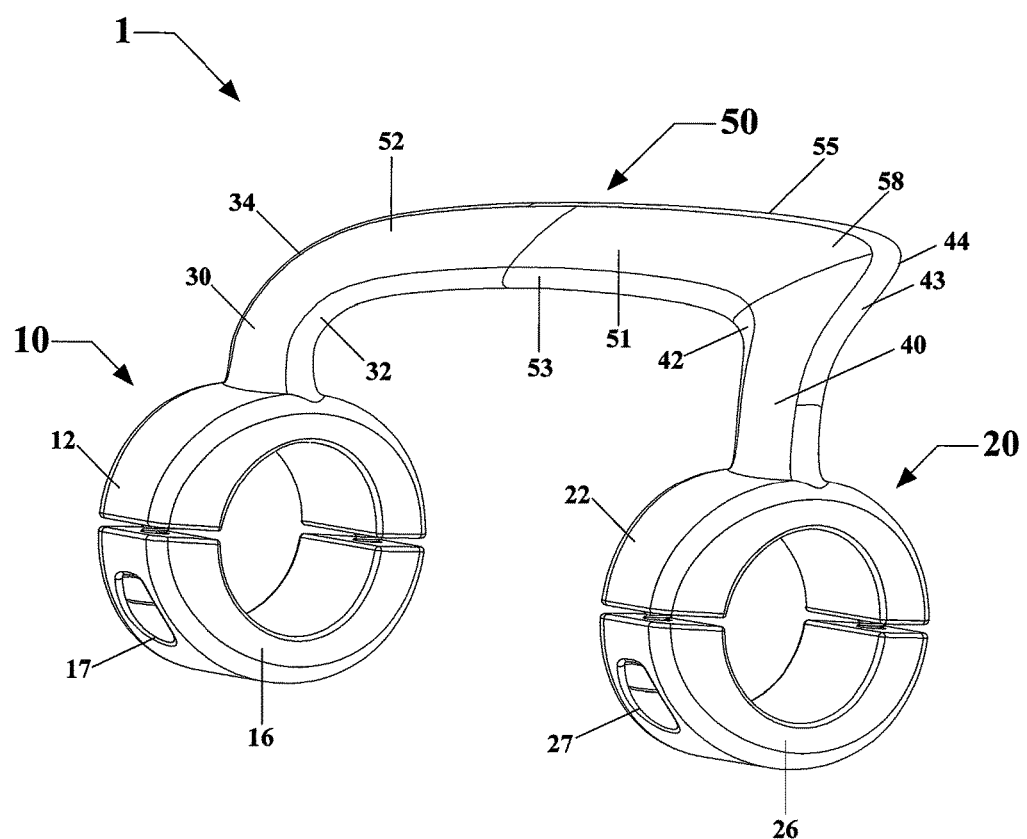
FIG. 1 is a front right perspective view of an assembled fishing rod handle.
Figure 2:
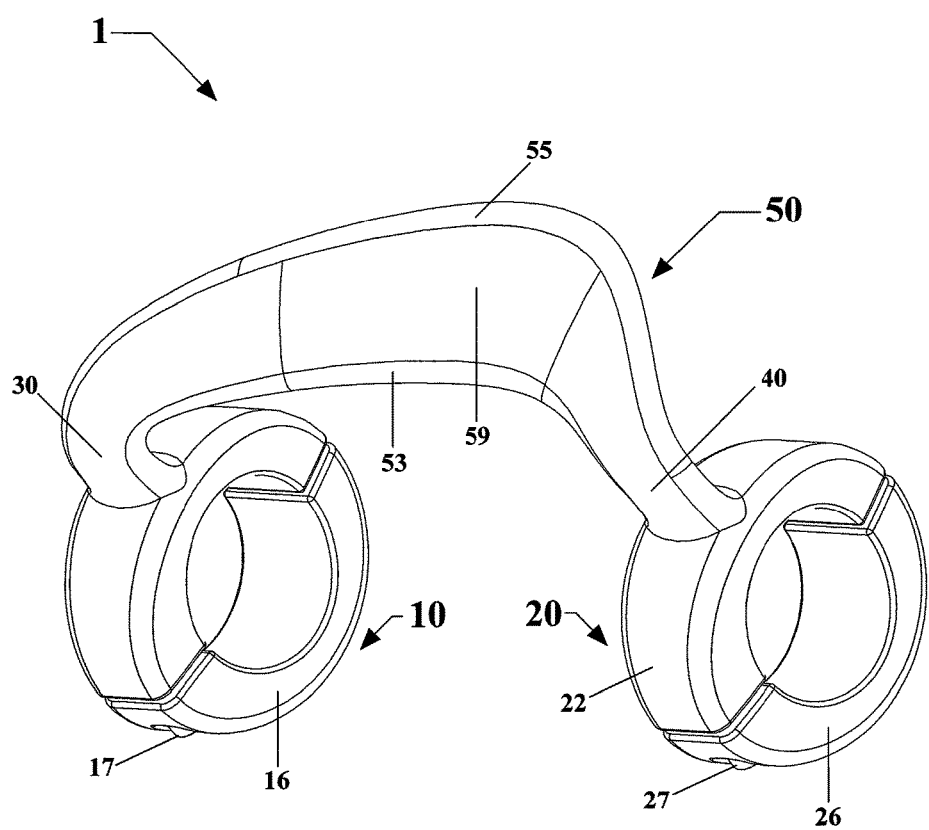
FIG. 2 is an upper front right perspective view of the fishing rod handle of FIG. 1.
Figure 3:
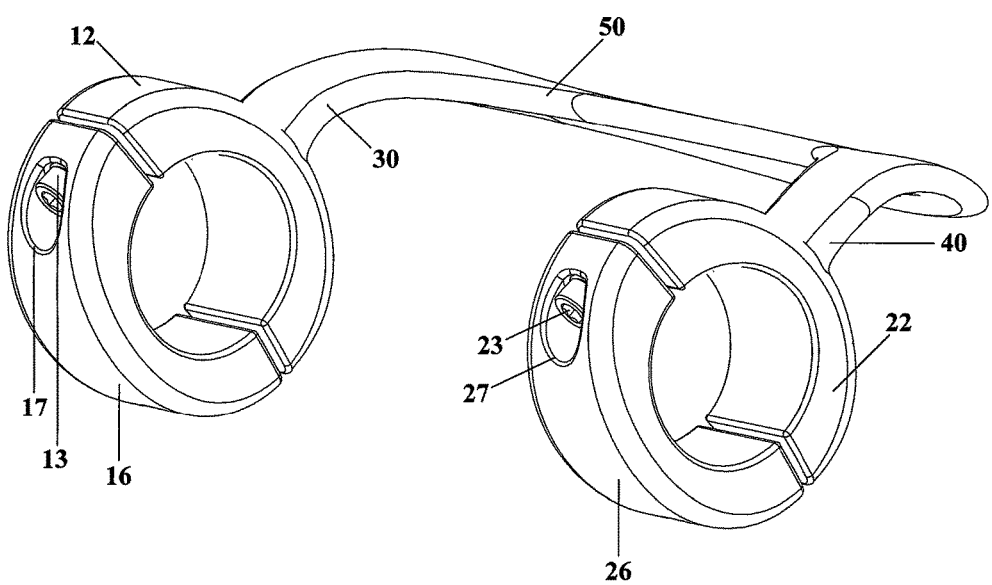
FIG. 3 is a lower front right perspective view of the fishing rod handle of FIG. 1.
Figure 4:
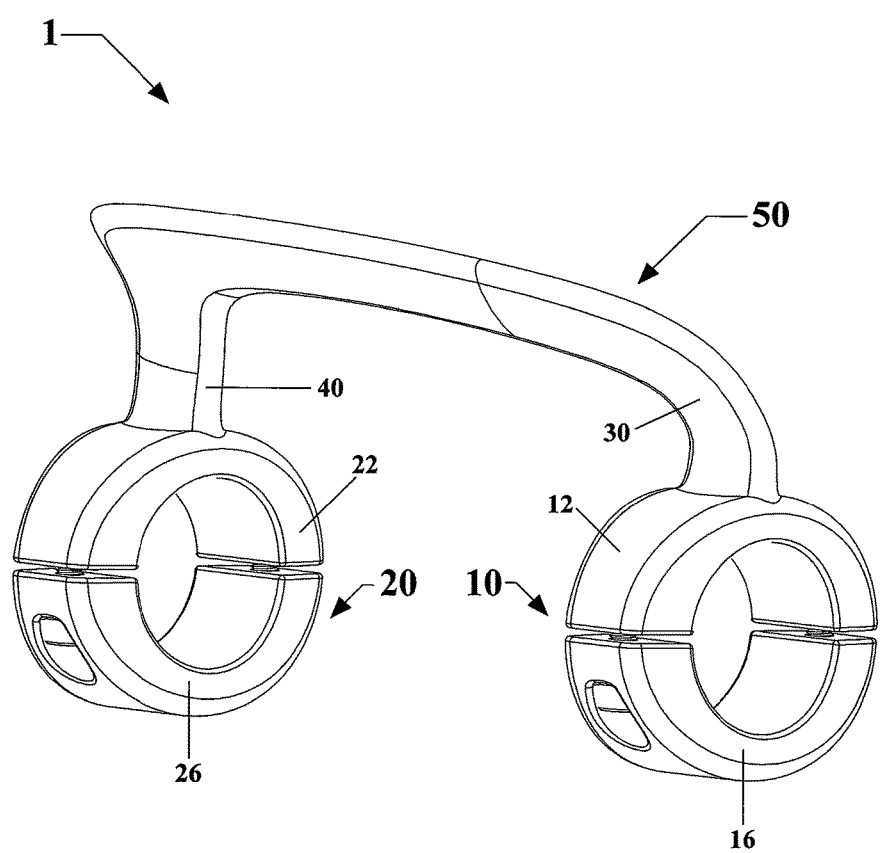
FIG. 4 is a rear right perspective view of the fishing rod handle of FIG. 1.
Figure 5:
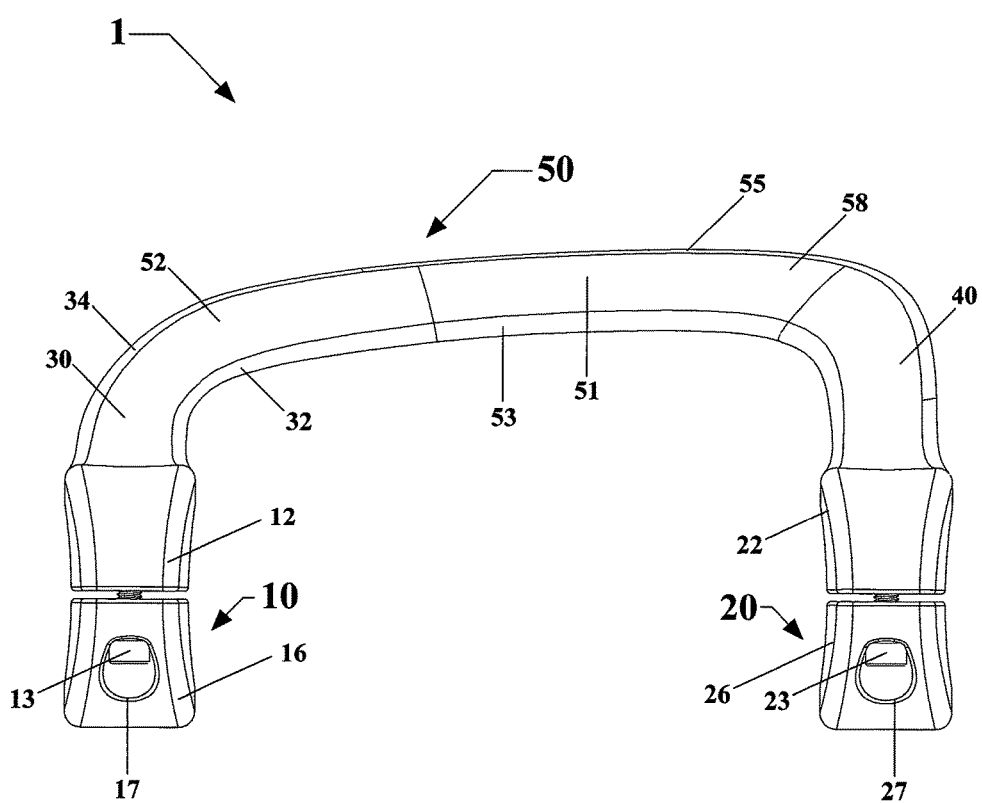
FIG. 5 is a front view of the fishing rod handle of FIG. 1.
Figure 6:
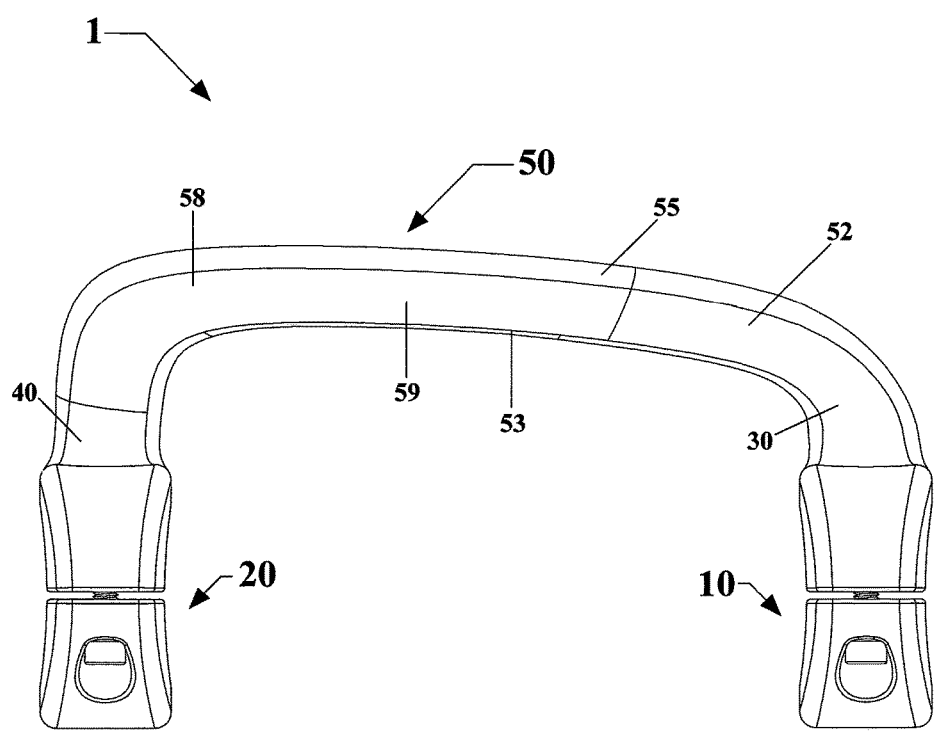
FIG. 6 is a rear view of the fishing rod handle of FIG. 1.
Figure 7:
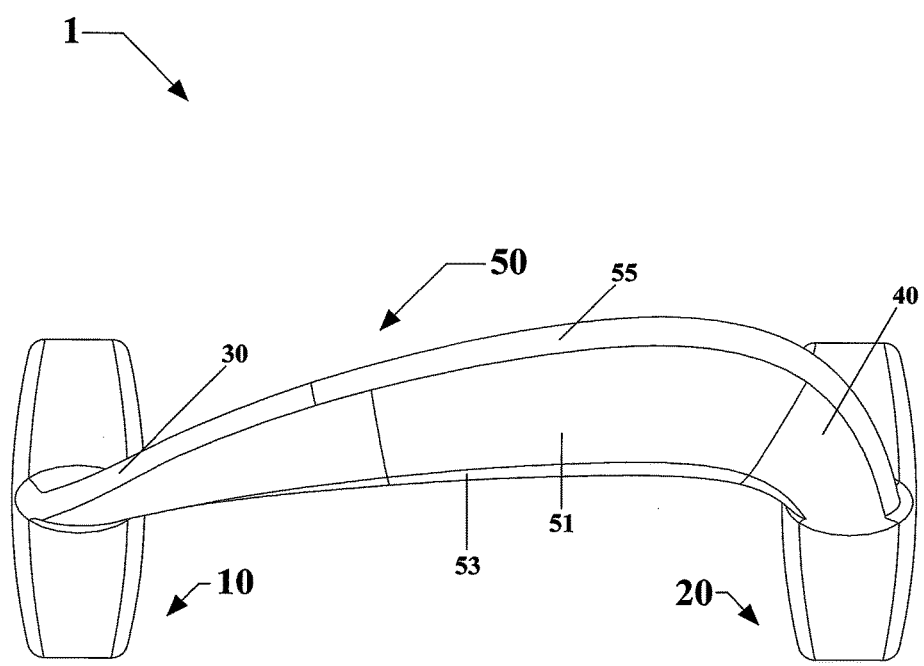
FIG. 7 is a top view of the fishing rod handle of FIG. 1.
Figure 8:
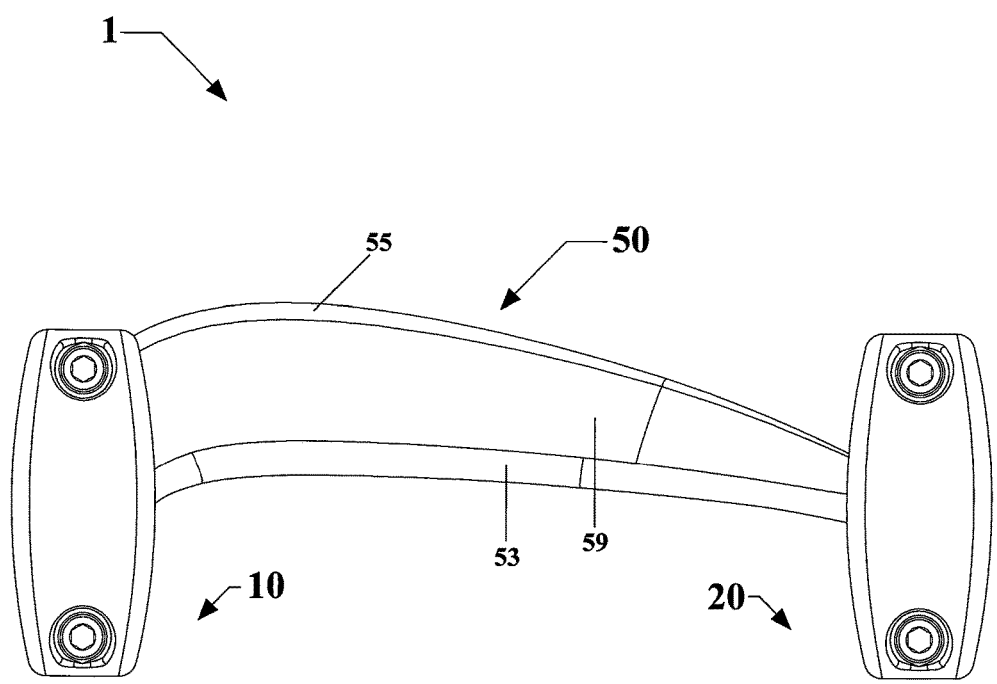
FIG. 8 is a bottom view of the fishing rod handle of FIG. 1.
Figure 9:
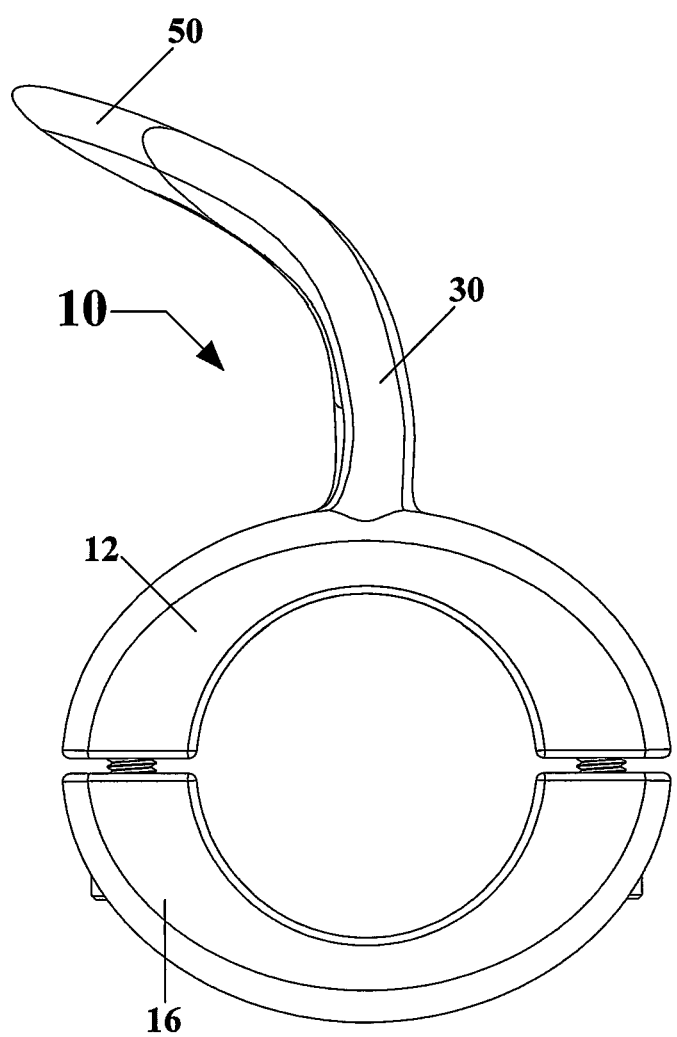
FIG. 9 is a left side view of the fishing rod handle of FIG. 1.
Figure 10:
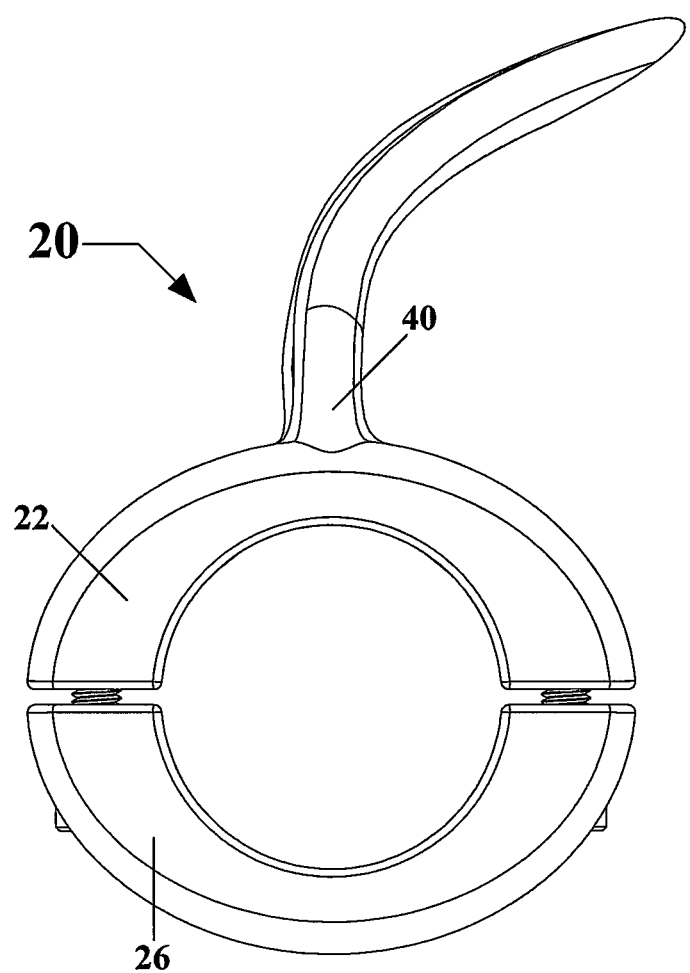
FIG. 10 is a right side view of the fishing rod handle of FIG. 1.

A list of components will now be described.
1 clampable fishing rod handle
10 first clamp
12 upper member of first clamp
13 fasteners(screws, bolts)
15 nuts
16 lower member of first clamp
17 counter-sunk opening(s)
20 second clamp
22 upper member of second clamp
23 fasteners(screws, bolts)
25 nuts
26 lower member of first clamp
27 counter-sunk opening(s)
30 first stem portion
32 inner concave surface
34 outer convex surface
40 second stem portion
42 inner concave surface
43 outer concave surface
44 outer convex surface 50 elongated bent member
51 generally smooth wide front face
52 first end of bent member
53 lower smooth edge perimeter surface
55 upper smooth edge perimeter surface
58 second end of bent member
59 generally smooth wide rear face
100 fishing rod
110 elongated handle end of rod
120 left hand
130 right hand FIG. 1 is a front right perspective view of an assembled fishing rod handle 1. FIG. 2 is an upper front right perspective view of the fishing rod handle 1 of FIG. 1. FIG. 3 is a lower front right perspective view of the fishing rod handle 1 of FIG. 1. FIG. 4 is a rear right perspective view of the fishing rod handle of FIG. 1. FIG. 5 is a front view of the fishing rod handle 1 of FIG. 1. FIG. 6 is a rear view of the fishing rod handle 1 of FIG. 1. FIG. 7 is a top view of the fishing rod handle 1 of FIG. 1. FIG. 8 is a bottom view of the fishing rod handle 1 of FIG. 1. FIG. 9 is a left side view of the fishing rod handle 1 of FIG. 1. FIG. 10 is a right side view of the fishing rod handle 1 of FIG. 1.

Referring to FIGS. 1-10, the clampable fishing rod handle 1 can include a first clamp 10 at one end with a first upwardly extending stem portion 30, and a second clamp 20 at an opposite end with a second upwardly extending stem portion 40. An elongated bent member 50 can be located between the first stem portion 30 and the second stem portion 40.

Both the first clamp 10 and the second clamp 20 can include respective upper end portions 12, 22 that are attached to first end 52 and second end 58, respectively of the bent member 50. The first clamp 10 and the second clamp 20 can each include lower member(s) 16, 26 that can attach to respective upper end portions 12, 22 by fasteners 13, 23, such as but not limited to screws and bolts, with nuts 15, 25 (shown in FIG. 17. The heads of the respective fasteners 13, 23 can be counter-sunk in lower side openings 17, 27 of respective lower members 16 and 26.

First stem portion 30 and second stem portion 40 can have generally flat front and flat rear faces that are parallel to longitudinal axes through respective clamps 10 and 20.

Both first stem portion 30 and second stem portion 40 can each have upper inner concave smooth surfaces 32, 42 facing one another, and outer convex smooth surfaces 34 and 44. Second stem 40 can also include a concave outer curved surface edge 43 between the bottom of second stem portion 40 and convex curved outer perimeter surface 44.

The elongated bent member 50 can include a generally smooth wide front face 51 and a generally smooth wide rear face 59. Elongated bent member 50 can have a lower smooth edge perimeter surface 53 and an upper smooth edge perimeter surface 55.

Figure 11:
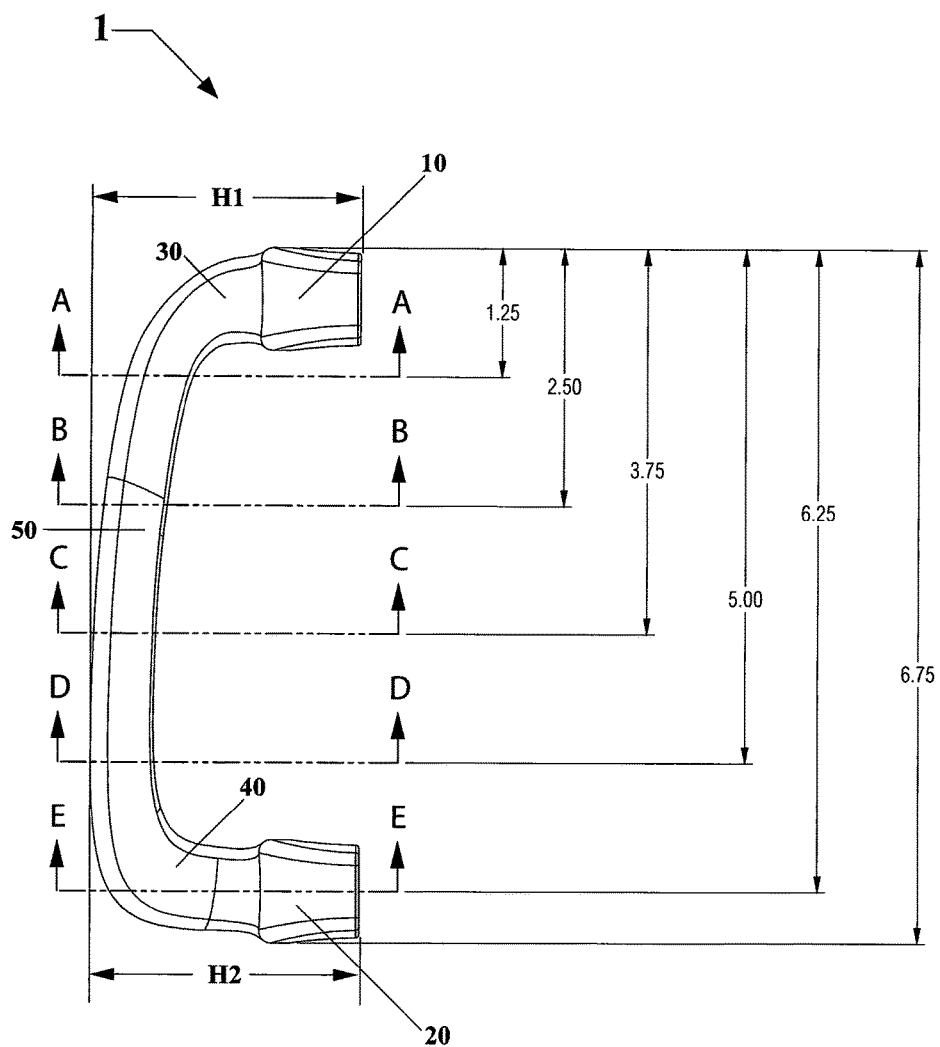
FIG. 11 is another rear side view of the fishing rod handle of FIG. 6.
Figure 12:
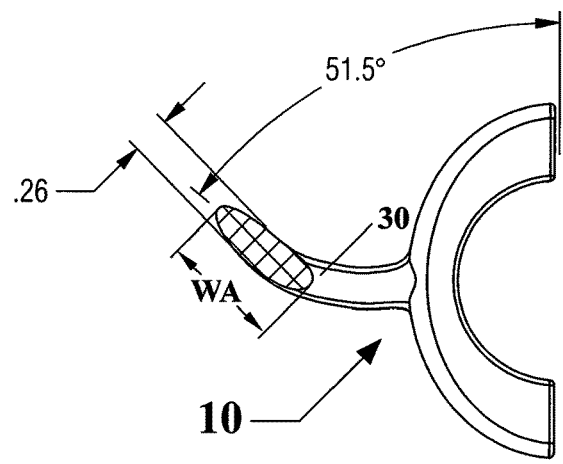
FIG. 12 is a cross-sectional view of the fishing rod handle of FIG. 11 along arrows A-A.
Figure 13:
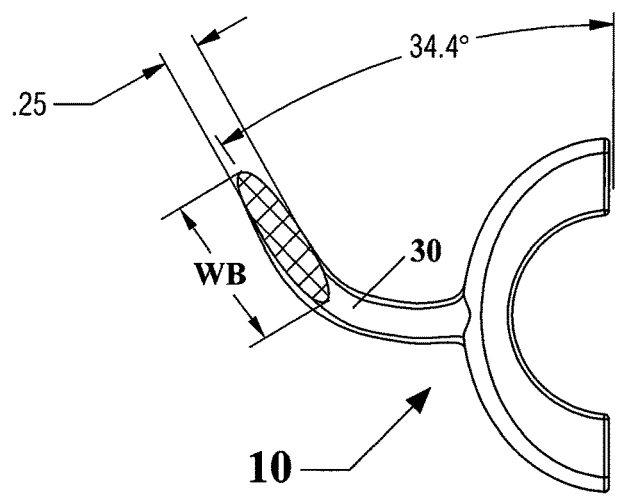
FIG. 13 is a cross-sectional view of the fishing rod handle of FIG. 11 along arrows B-B.
Figure 14:
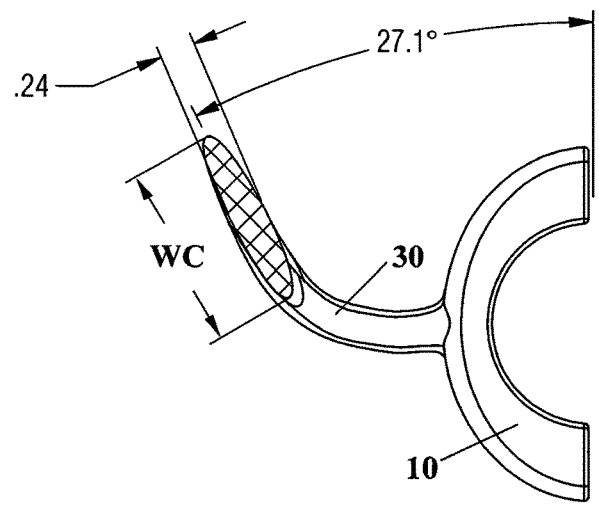
FIG. 14 is cross-sectional view of the fishing rod handle of FIG. 11 along arrows C-C.
Figure 15:
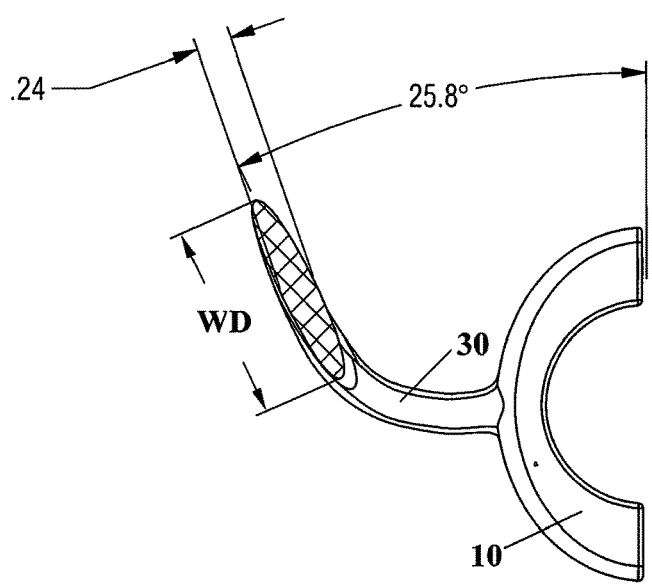
FIG. 15 is a cross-sectional view of the fishing rod handle of FIG. 11 along arrows D-D.
Figure 16:
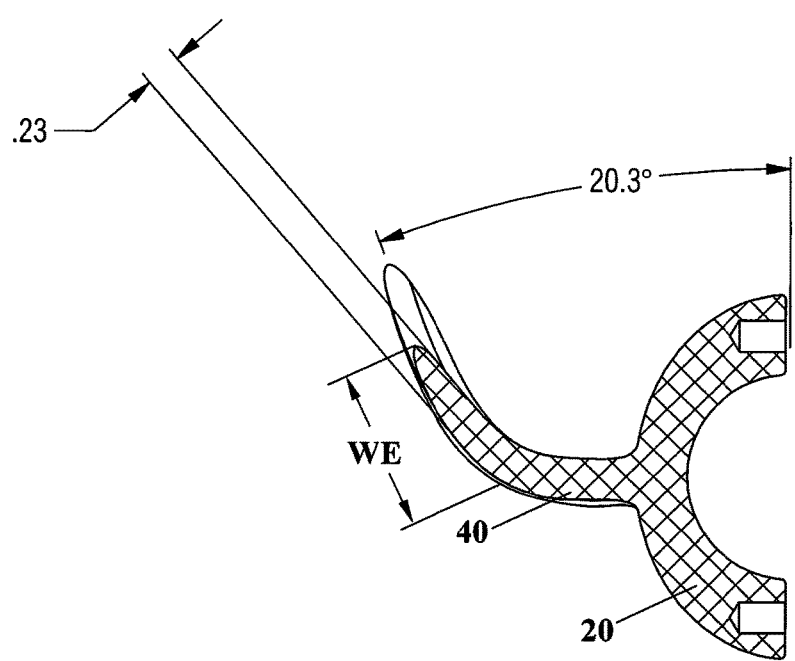
FIG. 16 is a cross-sectional view of the fishing rod handle of FIG. 11 along arrows E-E.

FIG. 11 is another rear side view of the fishing rod handle 1 of FIG. 6 with cross sectional markings and dimensions. FIG. 12 is a cross-sectional view of the fishing rod handle 1 of FIG. 11 along arrows A-A. FIG. 13 is a cross-sectional view of the fishing rod handle 1 of FIG. 11 along arrows B-B. FIG. 14 is cross-sectional view of the fishing rod handle 1 of FIG. 11 along arrows C-C. FIG. 15 is a cross-sectional view of the fishing rod handle 1 of FIG. 11 along arrows D-D. FIG. 16 is a cross-sectional view of the fishing rod handle 1 of FIG. 11 along arrows E-E.

Fishing rod handle 1 can have an overall length of approximately 6.75 inches, and a height along first stem portion 30 of H1, being approximately 2.06 inches, and a height along second stem portion 40 of H2, being approximately 2.55 inches.

Elongated bent member 50 can have various width dimensions of WA being approximately 0.81 inches, WB being approximately 1.03 inches, WC being approximately 1.21 inches, WD being approximately 1.31 inches, and WE being approximately 1.15 inches.

Figure 17:
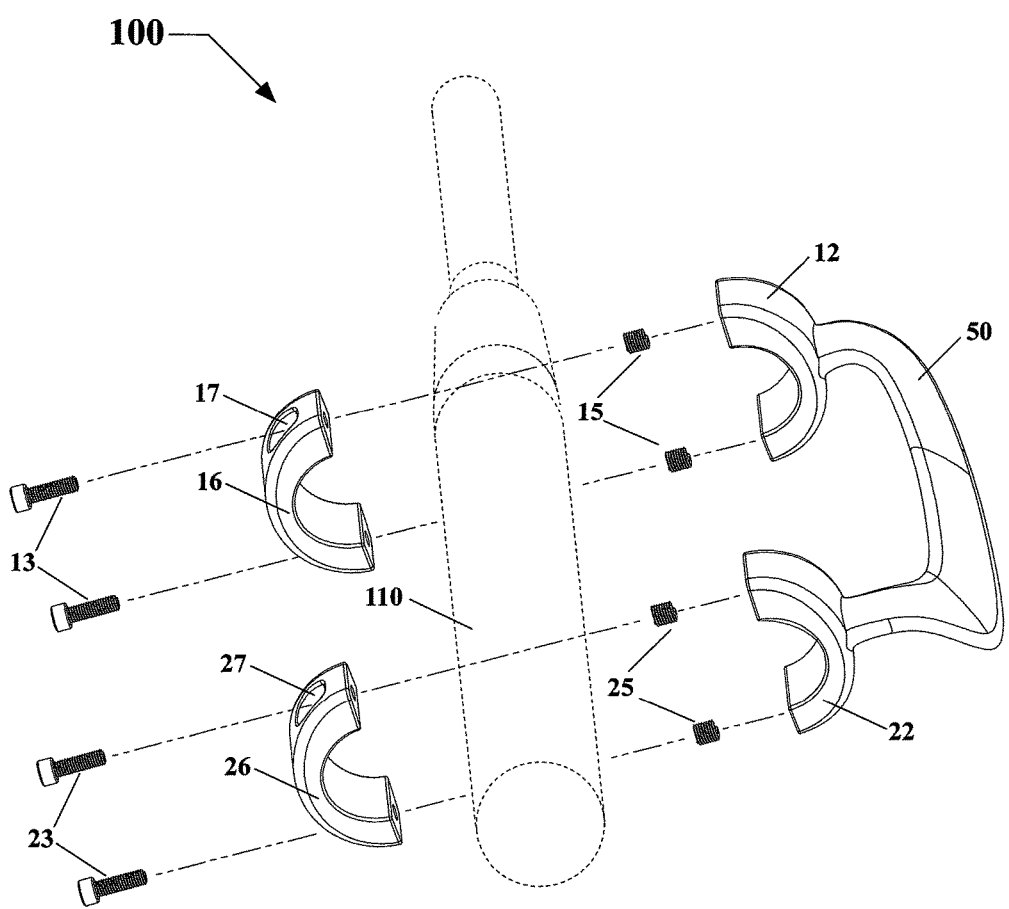
FIG. 17 is an exploded view of the fishing rod handle of FIG. 1 about to be assembled to an existing elongated handle of a fishing rod.

FIG. 17 is an exploded view of the fishing rod handle 1 of FIG. 1 about to be assembled to an existing elongated handle 110 of a fishing rod 100. Upper and lower members 12, 16, 22, 26 of first and second clamps 10, 20 can be clamped together about rod end 110 with fasteners 13, 23 and internal nuts 25, 25, where the fasteners can be counter-sunk into openings 17, 27 of the lower clamp members 16, 26.

Figure 18:
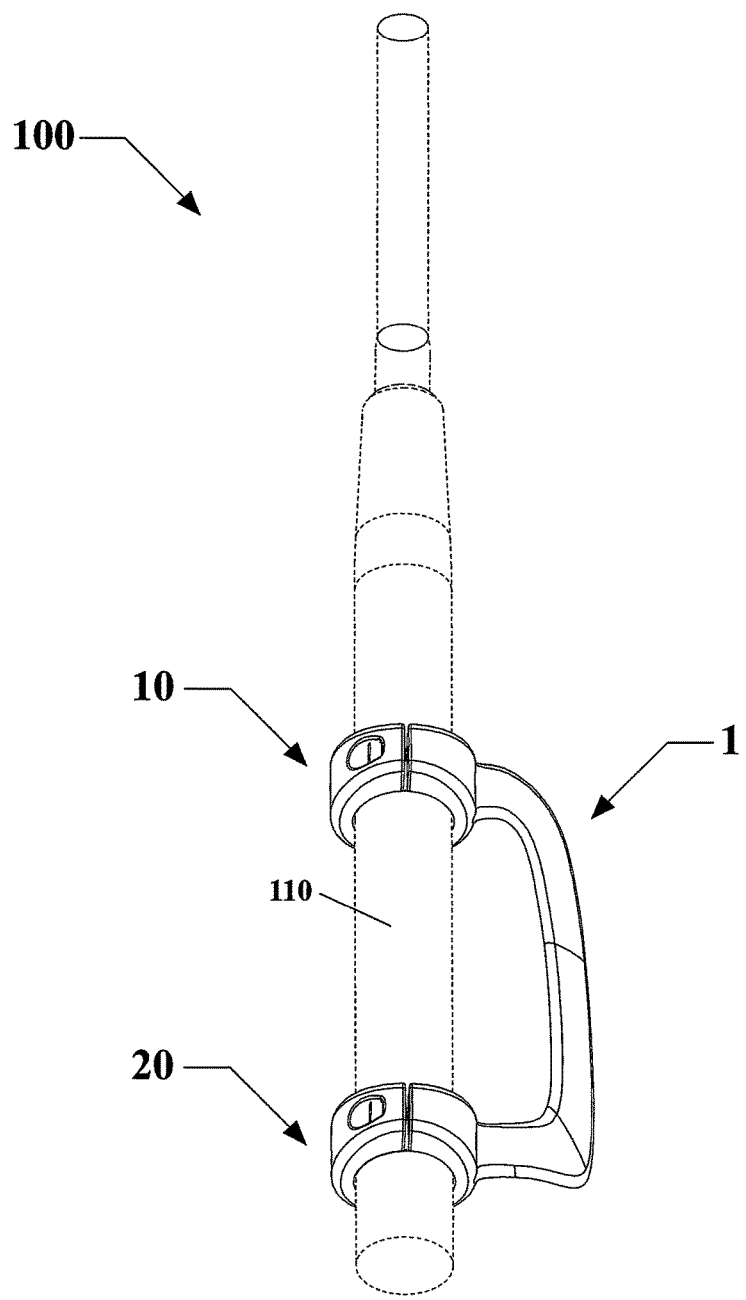
FIG. 18 is an assembled view of the fishing rod handle of FIG. 17 on the elongated handle of a fishing rod.

FIG. 18 is an assembled view of the fishing rod handle 1 of FIG. 17 clamped onto the existing elongated handle end 110 of a fishing rod 100.

Figure 19:
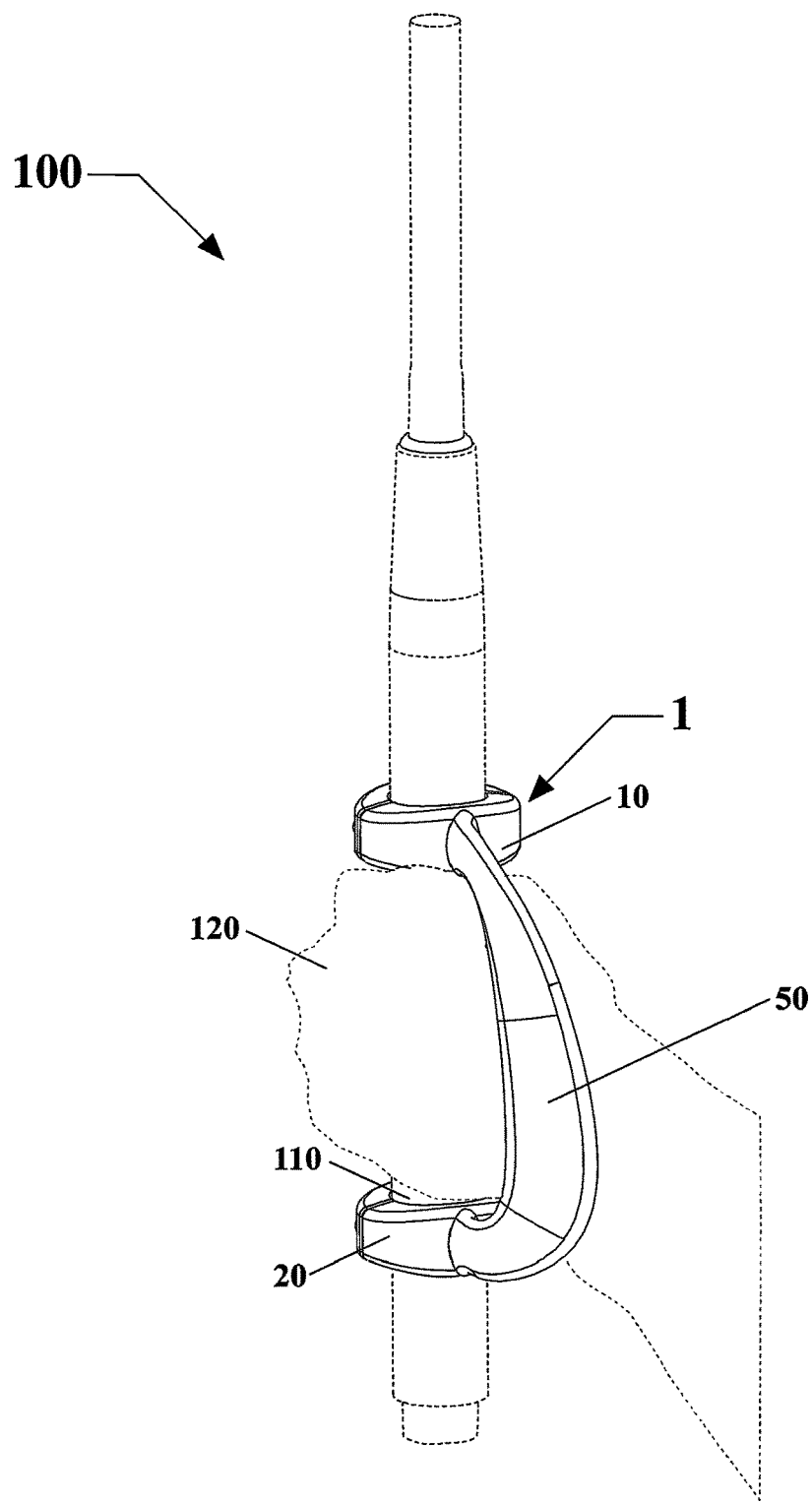
FIG. 19 shows a left hand of a fisherman holding the existing elongated handle of the fishing rod within the clamp ends of the fishing rod handle of FIG. 18.

FIG. 19 shows a left hand 120 of a fisherman holding the existing elongated handle end 110 of the fishing rod 100 within the clamp ends 10, 20 of the fishing rod handle 1 of FIG. 18.

Figure 20:
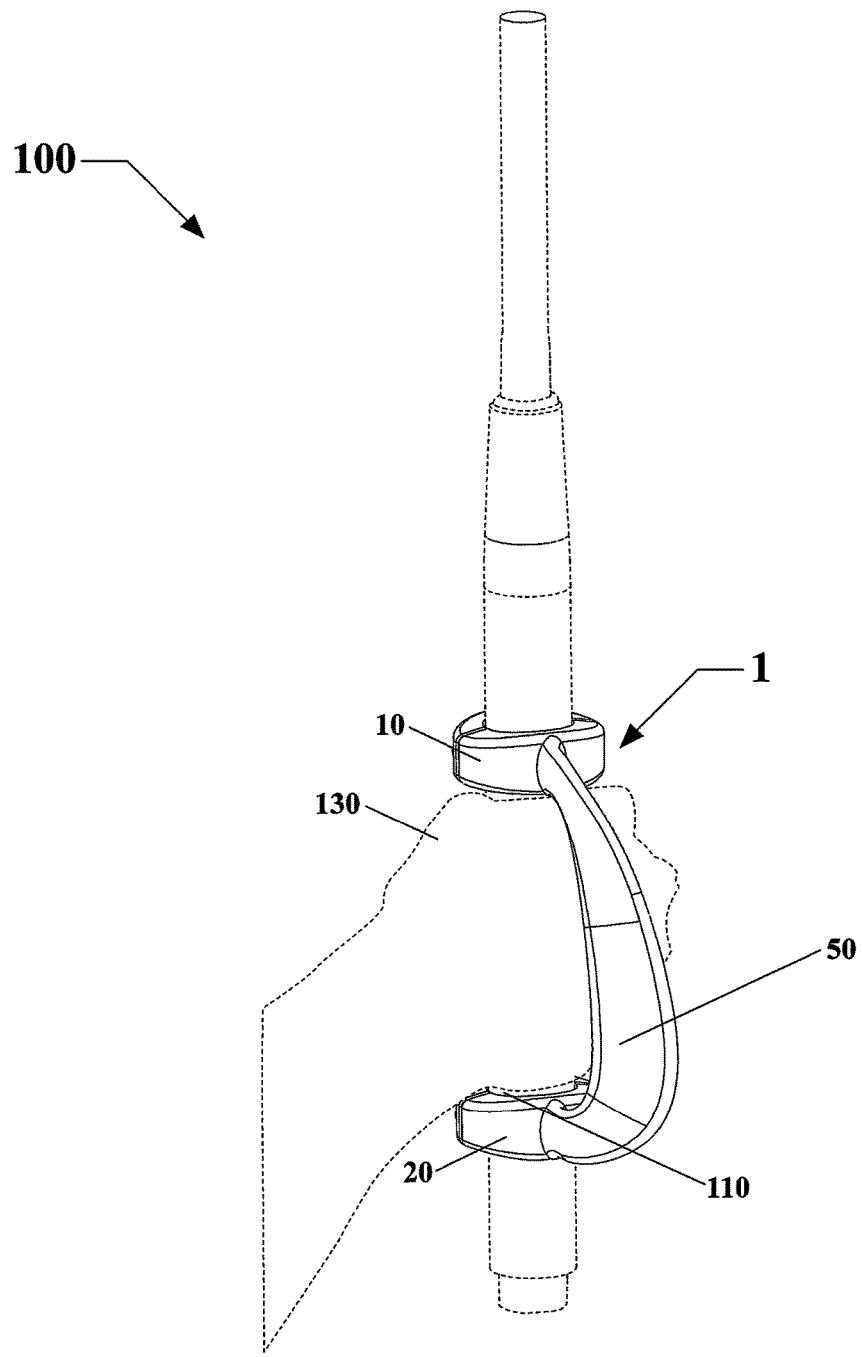
FIG. 20 shows a right hand of a fisherman holding the existing elongated handle of the fishing rod within the clamp ends of the fishing rod handle of FIG. 18.

FIG. 20 shows a right hand 130 of a fisherman holding the existing elongated handle end 110 of the fishing rod 100 within the clamp ends 10, 20 of the fishing rod handle 1 of FIG. 18.

The shape and smooth surfaces of the fishing rod handle 1 allow for the fisherman to have greater leverage and a more comfortable fit while the fisherman is using the fishing rod. Additionally, the rod handle also allows for a better grip on the existing rod handle 110 to allow for the rod 100 to be easily carried and transported from place to place.

The novel fishing rod handle 1 can be formed from molded plastic, injection molded plastic, and the like, as well as other materials, such as but not limited to fiberglass, metal, combinations thereof, and the like.

The term "approximately" can be +/−10% of the amount referenced. Additionally, preferred amounts and ranges can include the amounts and ranges referenced without the prefix of being approximately.

Although the invention is described in a preferred embodiment being clamped about the elongated handle end of fishing rod for increasing leverage for the fisherman, the novel clampable handle can be clamped about other devices, such as fishing poles, and/or handles on other sports equipment such as but not limited to tennis rackets, racquetball rackets, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An attachable handle for fishing rods, comprising:
a first clamp;
a second clamp;
a first stem portion extending upward perpendicular from the first clamp;
a second stem portion extending upward perpendicular from the second clamp, and in a top view the first stem portion of the first clamp and the second stem portion of the second clamp form a longitudinal center line between one another; and an elongated bent member between an upper end of the first stem portion and an upper end of the second stem portion, the elongated bent member having a lower smooth contiguous edge between the first stem portion and the second stem portion, and the bent member having an upper smooth contiguous edge between the first stem portion and the second stem portion, the bent member continuously bending in one direction along a front side face between the first stem portion and the second stem portion, the bent member is bent sideways at a first angle to the perpendicular first stem portion and at a second angle to the perpendicular second stem portion so the bent member is not directly over the longitudinal center line formed between the first stem portion and the second stem portion, wherein the first clamp and the second clamp are attachable about an existing elongated handle on a fishing rod, wherein the bent member with the continuously bending front side face between the first stem portion and the second stem portion, is adaptable to allow a hand of a fisherman to have greater leverage and a comfortable fit when gripping the elongated handle on the fishing rod, and in the top view the first stem portion and the second stem portion overlap with the longitudinal center line between the first clamp and the second clamp, wherein the elongated bent member curves to one side away from the longitudinal center line.

2. The attachable handle of claim 1, wherein the second angle is larger than the first angle.

3. The attachable handle of claim 1, wherein the first clamp and the second clamp, each include an upper member and a lower member, and fasteners for attaching the second upper member and the second lower member of the second clamp to each other, the first fasteners and the second fasteners being selected from screws and bolts.

4. The attachable handle of claim 1, wherein the first stem and the second stem each include a generally flat front face surface and a generally flat rear face surface.

5. The attachable handle of claim 1, wherein the second stem portion has a length longer than the first stem portion.

6. The attachable handle of claim 5, wherein the bent member has a first inner concave surface and a second inner concave surface with the lower smooth edge on the bent member attached therebetween.

7. The attachable handle of claim 1, further comprising:
a first convex outer curved perimeter surface between the upper end of the first stem portion and the bent member; and
a second convex curved perimeter surface between the upper end of the second stem portion and the bent member.

8. The attachable handle of claim 7, wherein the second convex curved perimeter surface has a larger angle than the first convex curved perimeter surface.

9. The attachable handle of claim 1, wherein attachable handle has a length of approximately 6.75 inches between the first clamp and the second clamp.

10. The attachable handle of claim 1, wherein the first clamp, the second clamp, the first stem portion, the second stem portion, and the bent member are formed from a single piece of plastic.

11. A method for using a handle with a fishing rod, comprising the steps of:
providing a fishing rod with a reel attached to the rod, and a rearwardly extending straight handle;
providing a first clamp with a first stem portion extending upward perpendicular from the first clamp;
providing a second clamp with a second stem portion extending perpendicular upward from the second clamp, wherein in a top view the first stem portion of the first clamp and the second stem portion of the second clamp forming a longitudinal straight line with one another;
providing an elongated bent member between an upper end of the first stem portion and an upper end of the second stem portion, the elongated bent member having a lower smooth perimeter edge between the first stem portion and the second stem portion, and the elongated bent member having an upper smooth perimeter edge between the first stem portion and the second stem portion, the elongated bent member is bent sideways at a first angle to the perpendicular first stem portion and at a second angle to the perpendicular second stem portion so that the bent member is not directly over the longitudinal straight line formed between the first clamp and the second clamp;
clamping the first clamp and the second clamp about the rearwardly extending straight handle of the fishing rod; and
gripping a portion of the handle end of the fishing rod between the first clamp and the second clamp to increase leverage while fishing with the fishing rod;
providing the bent member with a continuous bend in one direction along the front side face between the first stem portion and the second stem portion;
attaching the first clamp and the second clamp about an existing straight elongated handle on a fishing rod, wherein the bent member with the continuously bending front side face between the first stem portion and the second stem portion, is adaptable to allow a hand of a fisherman to have greater leverage and a comfortable fit when gripping the elongated handle on the fishing rod, and in the top view the first stem portion and the second stem portion overlap with the longitudinal straight line between the first clamp and the second clamp, wherein the elongated bent member curves to one side away from the longitudinal straight line.

12. The method of claim 11, wherein the second angle being larger than the first angle.

13. The method of claim 11, wherein the clamping step includes the steps of:
providing the first clamp and the second clamp with an upper member and a lower member; and
providing fasteners for attaching each upper member to each lower member.

14. The method of claim 11, further comprising the step of:
providing the second stem portion with a longer length than the first stem portion.

15. The method of claim 14, further comprising the steps of:
providing the bent member with a first inner concave surface and a second inner concave surface with the lower smooth edge on the bent member attached therebetween.

16. The method of claim 11, further comprising the steps of:
providing a first convex outer curved perimeter surface between the upper end of the first stem portion and the flat bent member; and
providing a second convex outer curved perimeter surface between the upper end of the second stem portion and the bent member.

17. The method of claim 16, further comprising the step of:
provide the second convex outer curved perimeter surface with a larger angle than the first convex outer curved perimeter surface.

18. A handle for fishing rods, comprising:
a first clamp;
a second clamp;
a first stem portion extending upward from the first clamp;
a second stem portion extending upward from the second clamp, the first stem portion and the second stem portion forming a longitudinal center line between one another; and
an elongated bent member between an upper end of the first stem portion and an upper end of the second stem portion, the elongated bent member continuously bending in one direction along a front side face between the first stem portion and the second stem portion, the bent member is bent sideways at a first angle to the first stem portion and at a second angle to the second stem portion so the bent member is not directly over the longitudinal center line formed between the first clamp and the second clamp, wherein the first clamp and the second clamp are attachable about an existing elongated handle on a fishing rod, wherein in the top view the first stem portion and the second stem portion overlap with the longitudinal center line between the first clamp and the second clamp, and wherein the elongated bent member curves to one side away from the longitudinal center line.

19. The handle for fishing rods of claim 18, wherein the first stem portion extends perpendicularly upward to the first clamp, and the second stem portion extends perpendicularly upward to the second clamp.

20. The handle for fishing rods of claim 18, wherein the second angle is larger than the first angle.

* * * * *